United States Patent [19]
Colchagoff

[11] 3,770,409
[45] Nov. 6, 1973

[54] APPARATUS FOR GUIDING GOBS OF MOLTEN GLASS
[75] Inventor: Robert D. Colchagoff, Toledo, Ohio
[73] Assignee: Owens-Illinois, Inc., Toledo, Ohio
[22] Filed: Dec. 23, 1971
[21] Appl. No.: 211,195

[52] U.S. Cl.................... 65/225, 65/304, 65/325, 65/356
[51] Int. Cl............................................. C03b 7/00
[58] Field of Search...................... 65/225, 221, 207, 65/303, 304, 327, 326, 325

[56] References Cited
UNITED STATES PATENTS

| | | | |
|---|---|---|---|
| 3,147,102 | 9/1964 | Trudeau | 65/225 |
| 2,790,019 | 4/1957 | Stalego | 65/327 X |
| 1,619,432 | 3/1927 | Mulholland | 65/304 |
| 1,600,488 | 9/1926 | Rule | 65/225 |
| 3,025,637 | 3/1962 | Lauck | 65/304 |
| 3,597,185 | 8/1971 | Jones | 65/225 |
| 3,672,860 | 6/1972 | Keller | 65/303 |

FOREIGN PATENTS OR APPLICATIONS

| | | | |
|---|---|---|---|
| 620,150 | 5/1961 | Canada | 65/225 |

Primary Examiner—S. Leon Bashore
Assistant Examiner—Kenneth M. Schor
Attorney—D. T. Innis et al.

[57] ABSTRACT

Apparatus for guiding gobs of molten glass that have been sheared from streams of molten glass issuing downwardly from a glass feeder. A horizontal arm is positioned such that one end is attached to the glass feeder and the other end terminates at a point slightly offset from the axis of gobs being sheared by the feeder mechanism. Mounted on the offset portion of the arm is a V-shaped guide block. The guide block is mounted such that it may be moved in two directions to insure centering of the V-shaped guide block with respect to the molten gobs of glass. Attached to the lower portion of the offset arm is a drop funnel positioned to receive gobs guided by the V-shaped guide block. The funnel is an elongated tubular member which has a generally circular cross-section near its upper end and tapers into a somewhat smaller, circular, opening at its lower end. The V-shaped guide block is formed hollow and is divided into two separate intercommunicating chambers to allow the introduction and circulation of a cooling fluid into and out of the V-shaped guide block to insure its proper functioning.

5 Claims, 9 Drawing Figures

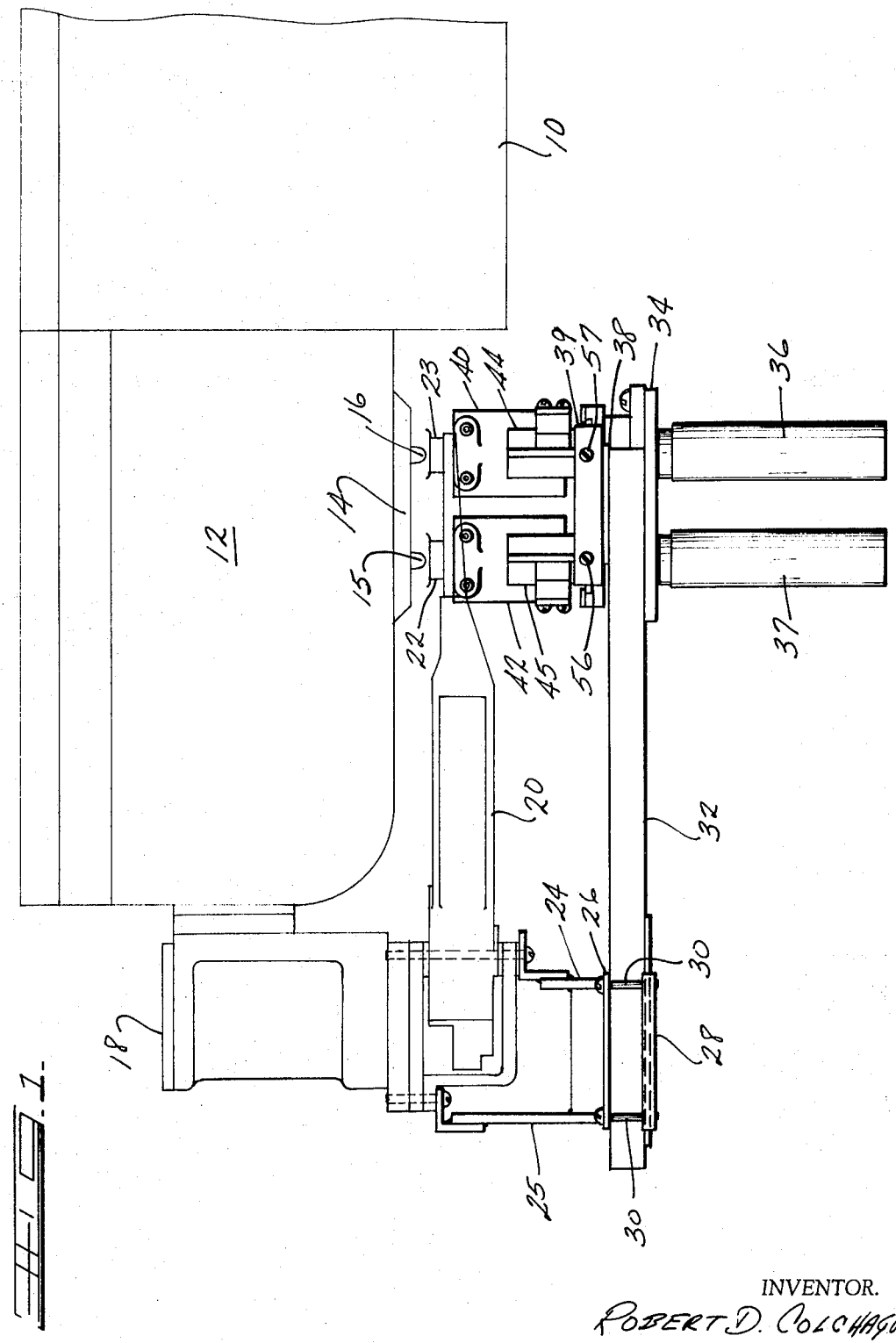

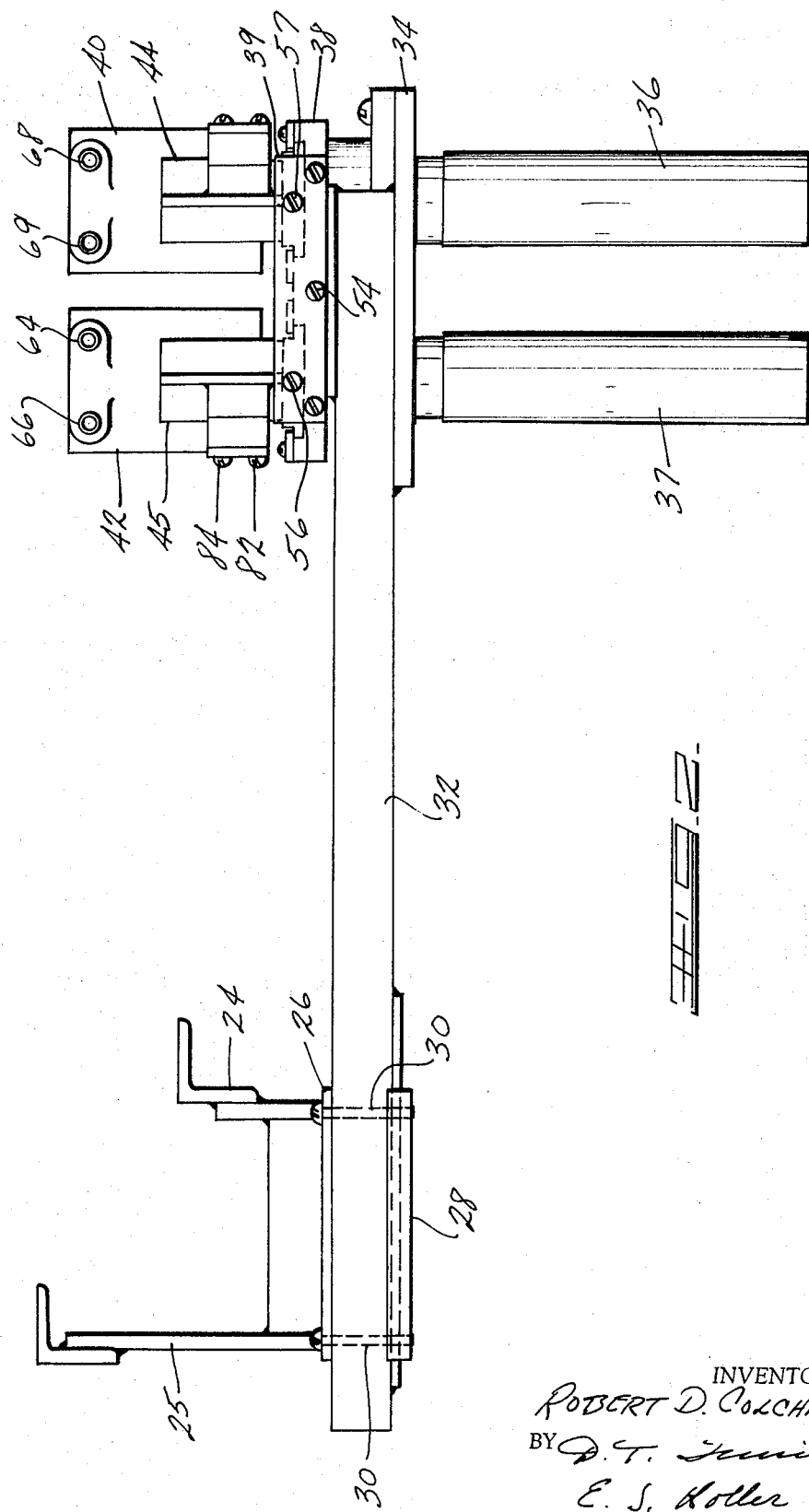

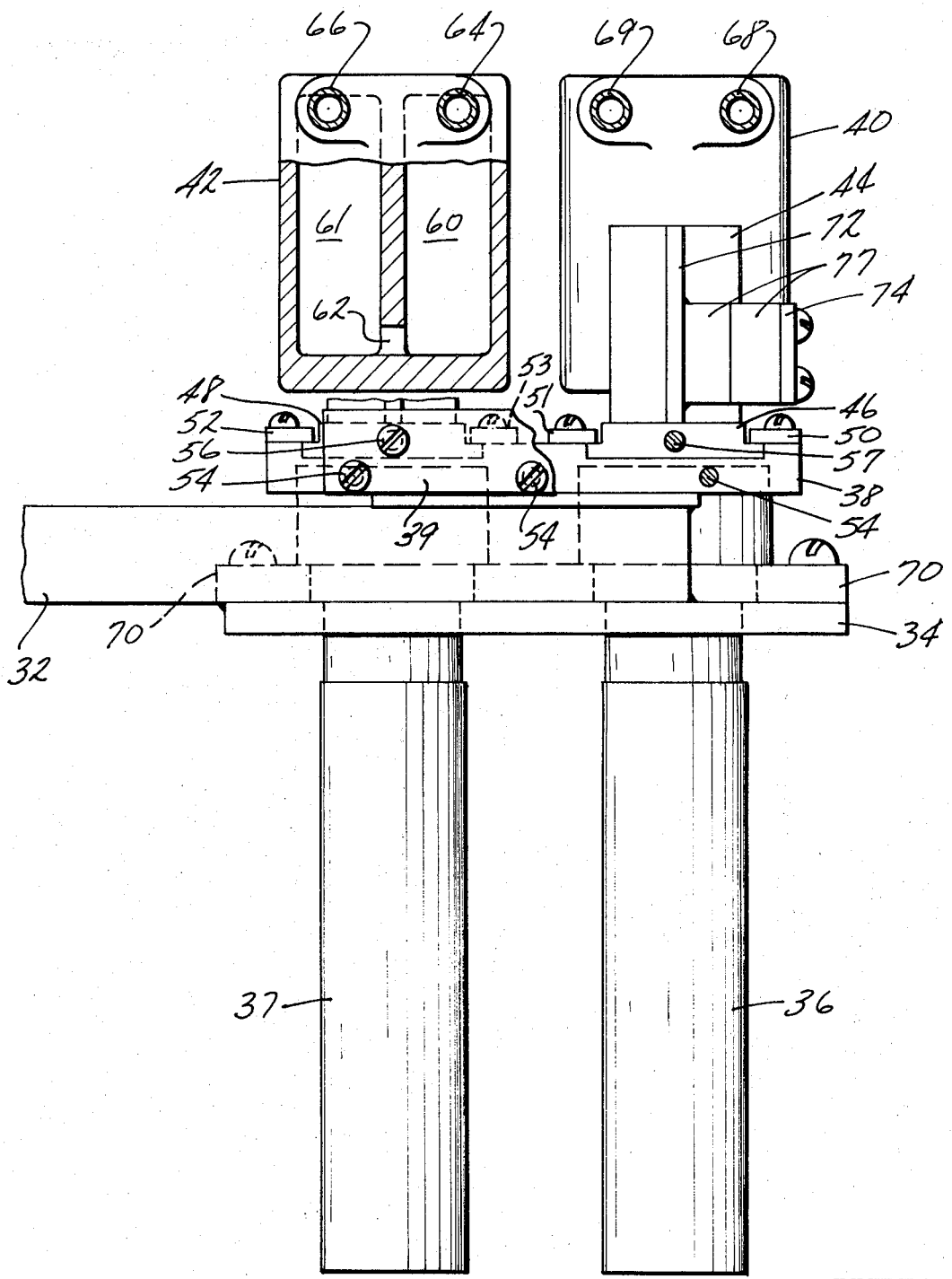

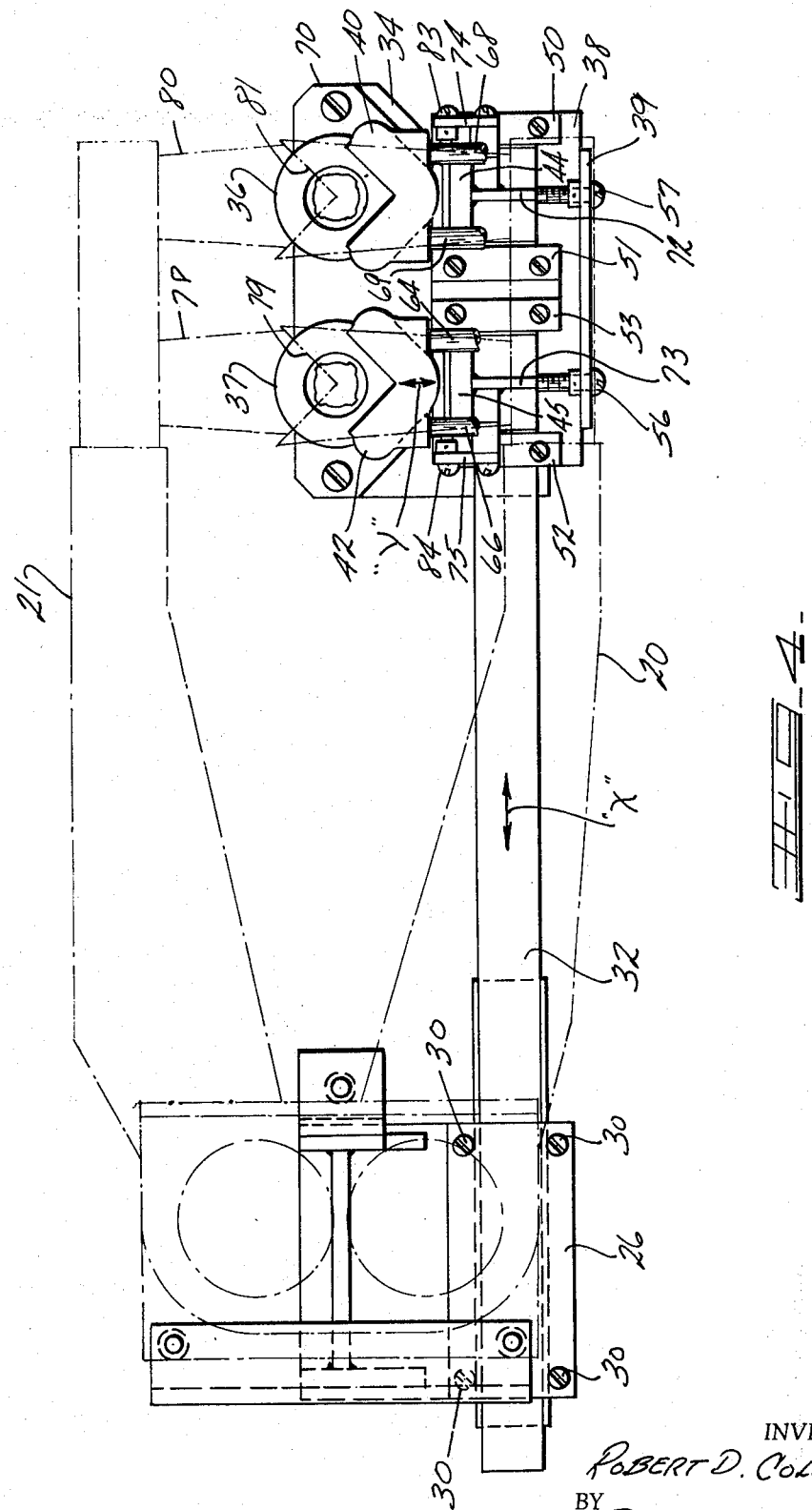

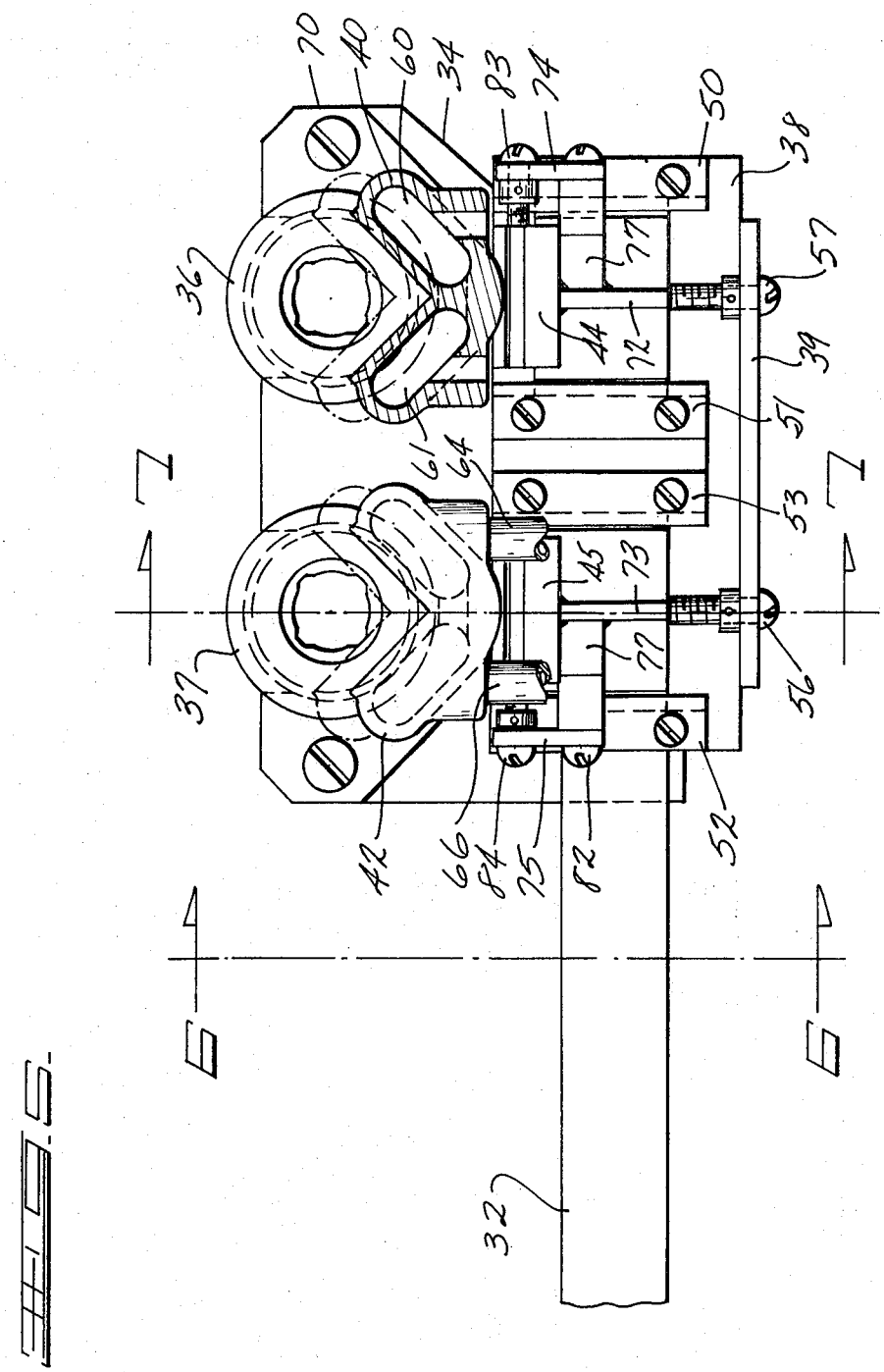

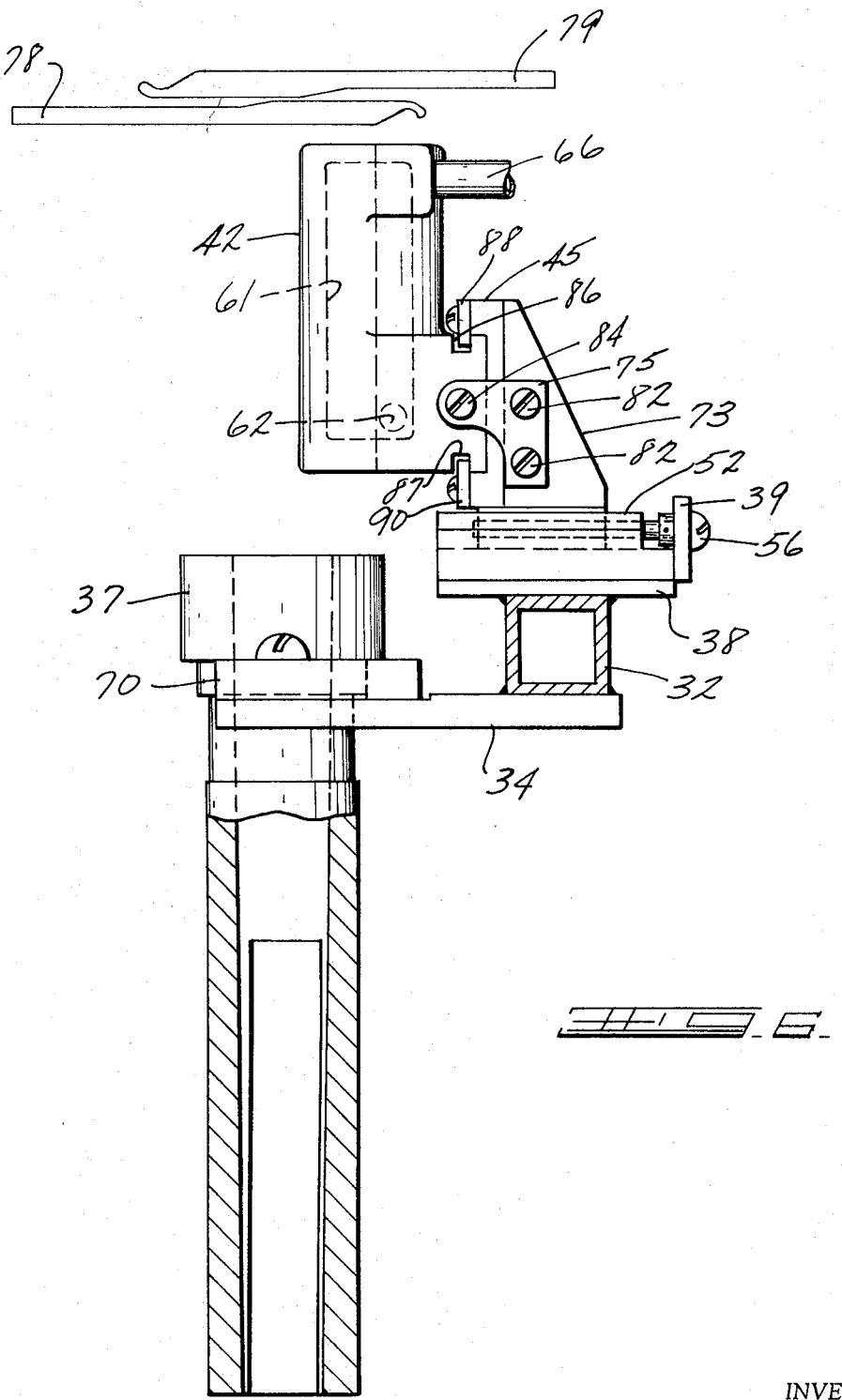

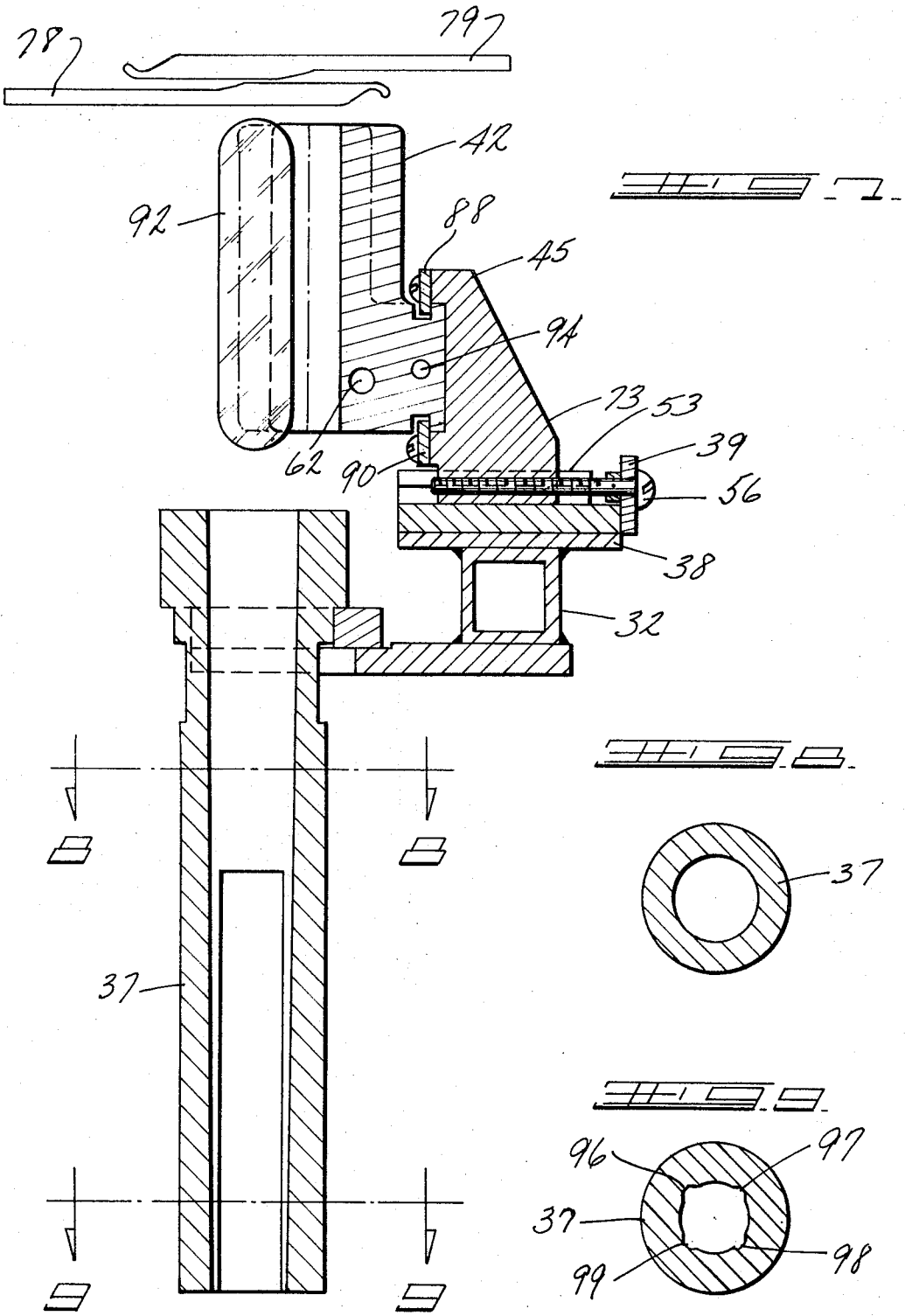

APPARATUS FOR GUIDING GOBS OF MOLTEN GLASS

BACKGROUND OF THE INVENTION

This invention generally relates to apparatus for guiding gobs of molten glass. More specifically, this invention relates to an elongated V-shaped guide block which is carried by an arm attached to a glass feeder mechanism. Most particularly, this invention relates to a fixed V-shaped guide block attached to an arm carried by a glass feeder mechanism and a tapered drop guide attached to receive gobs guided by the V-shaped guide block.

While the use of drop guides to help stabilize sheared gobs of molten glass is known in the art, these drop guides have usually been fixed to the shearing blades in some manner. That is, in the common gob feeding apparatus for glass forming machines, where shears cut an issuing stream of molten glass into discrete gob shapes, the drop guides have been attached to and moved with the shears themselves to aid in steadying the gob as it is cut. However, it should be clear that once the cutting stroke has been concluded, the drop guides rapidly move away from the gob, as sheared, and thus are unable to provide continuous control over the attitude of the severed gob. In addition, guide funnels, which have been used to receive the severed gob, have been attached at a separate point on the forming machine. By use of the present invention, it has been found that greater control of the attitude and velocity of the severed gobs can be attained, since the drop guides themselves are fixed in position and thus able to maintain control of the severed gob for a longer period of time, and the tapered section of the drop funnel of this invention allows better control of the attitude and position of the severed gob without disturbing the acceleration and velocity of the gob.

SUMMARY OF THE INVENTION

This invention is an apparatus for guiding gobs of molten glass that have been sheared from streams of molten glass issuing downwardly from a glass feeder. A generally horizontal arm is attached at one end to the glass feeder. Its other end is allowed to extend outwardly into a position slightly offset from the axis of the gobs being sheared. A V-shaped guide block is mounted on the extending end of the arm with the upper end of the V-block being located immediately below the plane of the glass shears. The mounting of the V-shaped guide block is such that horizontal adjustment is possible in two separate directions for accurately positioning the V-block in precise alignment with the vertical axis of any gob being severed. A drop funnel is positioned in vertical alignment beneath the V-block to receive gobs centrally into the drop funnel. The drop funnel itself is an elongated tubular member having a generally circular cross-sectional opening in its upper end and tapering to a smaller circular cross-sectional opening at its lower end.

BRIEF DESCRIPTION OF THE DRAWINGS

FIG. 1 is a side-elevational view of the gob-guiding apparatus of the present invention in position on a glass feeder;

FIG. 2 is an elevational view, similar to FIG. 1, on an enlarged scale, of the apparatus of the present invention removed from its operational environment;

FIG. 3 is a side-elevational view of the drop guides and drop funnels of the present invention, partially cut away;

FIG. 4 is a top plan view of the apparatus of the present invention with a glass shearing mechanism superimposed in phantom line thereover;

FIG. 5 is a top plan view of the apparatus of FIG. 3 partially cut away;

FIG. 6 is a sectional view taken along the line 6—6 in FIG. 5;

FIG. 7 is a sectional view taken along the line 7—7 in FIG. 5;

FIG. 8 is a cross-sectional view of the upper end of the drop funnel taken at line 8—8 of FIG. 7; and FIG. 9 is a cross-sectional view of the lower end of the drop funnel taken at line 9—9 of FIG. 7.

DETAILED DESCRIPTION OF THE DRAWINGS

As seen in FIG. 1, the forward end of a glass melting forehearth 10 is shown connected into a feeder section 12. From the feeder section 12, by apparatus well-known to those skilled in the art, molten glass is forced through an orifice 14 in the form of two streams of molten glass 15 and 16. It will be appreciated that the two streams of molten glass 15 and 16 are shown only for the purposes of illustration, and that the apparatus, to be hereinafter described, would be equally useful with a single stream of molten glass or with more than two streams of molten glass. The streams of molten glass 15 and 16 are severed into discrete gobs of glass for feeding to the glass forming mechanism by a gob-severing mechanism well-known to those skilled in the art. The gob-severing mechanism comprises a mechanism box 18, two extending arms 20 and 21 (only one of which is visible in FIG. 1) which are moved by the mechanism box 18 to shear the glass streams 15 and 16 with shear blades mounted on their ends. The shear blades are not visible in FIG. 1, but their mounting plates 22 and 23 may be seen. As may be seen in FIGS. 1 and 2, mounted on the lower portion of the mechanism box 18 are two L-shaped vertical brackets 24 and 25. The brackets 24 and 25 are attached at their lower end to a horizontal mounting plate 26. The horizontal mounting plate 26, in turn, is attached to a lower clamp plate 28 by a plurality of bolts 30. Trapped between the horizontal mounting plate 26 and the lower clamp plate 28 is an extending arm 32, which, as can be seen in FIG. 4, is substantially square in cross-section. The arm 32 extends generally parallel with respect to a vertical plane passing through the center line of the streams of molten glass 15 and 16, to a point substantially in line with the streams of molten glass 15 and 16. The terminal point of the extending arm 32 is offset with respect to the center line of the streams of molten glass 15 and 16. Attached to the lower portion of the extremity of the extending part of the arm 32 is a horizontal flat plate 34. The plate 34 serves to carry two drop funnels 36 and 37. On the upper portion of the extremity of the extending arm 32, a slide plate 38 is mounted. Two V-shaped gob guides 40 and 42 are slideably mounted on the slide plate 38 through respective mounting plates 44 and 45 attached to an adjustment stop plate 39.

Turning now to FIG. 3, the details of the mounting of the V-shaped gob guides 40 and 42 may be seen. The mounting plate 45 for the gob guide 42 has been cut away as well as a portion of the gob guide 42, in order to show the internal construction of the gob guides 40 and 42, it being appreciated that the internal construction of both gob guides 40 and 42 is identical. In addition, a portion of the adjustment stop plate 39 has been cut away in order to see the mounting arrangement of the mounting plate 44. It may be seen that the mounting plate 44 terminates in a lower section 46, which is elongated and substantially T-shaped. The mounting plate 45 terminates in a corresponding lower, elongated T-shaped base 48 (shown in dotted lines). The T-shaped base 46 rests in a channel cut in the upper surface of the slide plate 38. The T-shaped base 48 rests in a corresponding channel cut in the slide plate 38. A pair of elongated rails 50 and 51 extend over the cross arms of the T-shaped base 46 to effectively trap the T-shaped base 46 in position and constrain it to a sliding motion along the channel in the slide plate 38. Corresponding, elongated rails 52 and 53 form a similar function for the T-shaped base 48. The adjustment stop plate 39 is secured to the slide plate 38 by three screws 54. Two adjustment screws 56 and 57 have their heads rotatably mounted in the adjustment stop plate 39 and their stems are threaded in the respective T-shaped bases 46 and 48. In FIG. 3, the head of adjustment screw 57 is not visible, the adjustment stop plate 39 having been partially cut away, but rather the adjustment screw 57 is shown in section. It may thus be appreciated, that turning the adjustment screws 56 and 57 will cause the mounting plates 44 and 45 to be moved back and forth along the slide plate 38, thereby moving the V-shaped gob guides 40 and 42 back and forth concurrently. This adjustable function is required in order to position the gob guides 40 and 42 accurately with respect to the falling, severed glass gobs. As noted previously, and as can be seen when viewing FIGS. 3 and 5, the interior of the V-shaped gob guides 40 and 42 are hollow and are divided into two interconnected chambers 60 and 61. The two chambers are connected at their bottom by a passageway 62. The gob guide 42 has an inlet fitting 64 connected to the chamber 60 and an outlet fitting 66 connected to the outlet chamber 61. The gob guide 40 has corresponding inlet and outlet fittings 68 and 69. The chambers 60 and 61 are provided to allow the introduction of a cooling fluid into the drop guides 40 and 42 to prevent damage to the drop guides 40 and 42 due to the contact of the molten glass gobs. The cooling fluid is introduced through the inlet fittings 64 and 68, passes through the chamber 60 through the passageway 62 into the chamber 61 and exits through the outlet fittings 66 and 69. Thus, there is provided a clear flow channel through the gob guides 40 and 42 for the cooling fluid used.

The horizontal flat plate 34 has two semi-eliptical cutouts formed in its edge facing toward the glass streams 15 and 16. The drop funnels 36 and 37 are slid into position in the semi-eliptical cutouts. A locking plate 70 is secured to the horizontal flat plate 34 and provides a method for locking the drop funnels 36 and 37 into position. The drop funnels 36 and 37 have a flat section milled on their sides, and when they are positioned over the locking plate 70 and rotated, a lobe on the locking plate 70 wedges the drop funnels 36 and 37 into position in a camming action. Also, it will be noted in FIG. 3, that the mounting plate 44 has a reinforcing web portion 72. The mounting plate 45 has a corresponding web 73 which may best be seen in FIGS. 4-6. Neither of the gob guides 42 and 40 are fixed to their mounting plates 44 and 45, but rather are attached by connecting plates 74 and 75 through spacer blocks 77 to the corresponding webs 72 and 73, in a manner best seen in FIGS. 6 and 7.

With reference to FIGS. 4 and 5, the alignment of the gob guides 40 and 42 with respect to the shear blades may be readily seen. It can be seen now that the two shear arms 20 and 21 each carry cooperating shear blades 78, 79, 80 and 81. It may be appreciated that the gross alignment of the gob guides 40 and 42 may be achieved by loosening the bolts 30 holding the extending arm 32 in position and sliding the extending arm 32 to obtain a general alignment. This gross alignment is that indicated by the arrow "X" in FIG. 4. Adjustment may then be made in the direction indicated by the arrow "Y" in FIG. 4 by the use of the adjusting screws 56 and 57, whose functioning was explained in conjunction with FIG. 3.

Turning now to FIGS. 6 and 7, the mounting arrangement for the gob guides 40 and 42 to allow fine adjustment in the X direction, as shown in FIG. 4, can be seen. The connecting plates 74 and 75 are bolted to the spacer blocks 77 by bolts 82. The spacer blocks 77 themselves in turn are secured to the webs 72 and 73, which are a part of the mounting plates 44 and 45 respectively. Adjustment screws 83 and 84 are in engagement with their respective connecting plates 74 and 75 and threaded openings extending through the rear portion of the gob guides 40 and 42. As can best be seen in FIG. 6 and 7, the rear portion of the gob guide 42 contains substantially rectangular horizontal channels 86 and 87. The rear section of the gob guide 42 then is placed into a channel in the portion of the mounting plate 45 facing toward the gob guide 42, the channel being defined by projecting portions of the mounting plate 45. The gob guide 42 is then locked in position with respect to the mounting plate 45 by a horizontal upper rail member 88 attached to the projection on the mounting plate 45 and a lower rail member 90 attached to the lower projection on the mounting plate 45. The rail members 88 and 90 project into the rectangular channels 86 and 87 and thus allow the gob guide 42 to move relative to the mounting plate 45. This movement is controlled by the adjustment screw 84 in a manner similar to that previously discussed with respect to the adjusting screws 56 and 57. That is, rotation of the adjustment screw 84 will move the gob guide 42 relative to the mounting plate 45 in the X direction, as indicated on FIG. 4. The gob guide 40 is mounted in a similar manner to the mounting plate 44. Thus, the gob guides 40 and 42 may be accurately positioned with respect to the dropping gobs. The position of the gob guides 40 and 42 shown in dotted lines in FIG. 5 are those in which the gob guides 40 and 42 would normally be placed for operation. The full-line views are retracted positions of the gob guides 40 and 42 requiring movement in the Y direction for perfect alignment with the drop funnels 36 and 37. The sectional view of FIG. 7 further illustrates the construction and mounting of the gob guides 42 to allow the necessary movement in the X and Y directions for proper alignment. The dotted position of the gob guide 42 in FIG. 7 is that in which it would normally contact a glass gob 92 for proper positioning for the drop into the drop funnel 37. Also seen in the sectional view of FIG. 7, is the threaded hole 94 in the gob guide 42 which engages the adjusting screw 84.

FIG. 8 illustrates the substantially circular cross-section of the upper portion of the drop funnel 37, it being understood that the drop funnels 36 and 37 are essentially identical. A cross-sectional area near the top of the drop funnel 37 is generally of a greater diameter than that of the gob 92 to be fed into the drop funnel 37. As the gob progresses through the drop funnel 37, the opening in the drop funnel 37 tapers until the configuration shown in FIG. 9 is reached at the lower portion of the drop funnel 37. This tapering of the drop funnel 37 insures that the gob 92 falling through the funnel is guided properly and is in the correct attitude for feeding into the glass forming machine as it exits from the drop funnel 37. It will be noted that as the cross-sectional area of the drop funnel 37 tapers, four circular grooves are provided in the sides of the drop funnel 37. These grooves 96, 97, 98 and 99 are provided to insure that the gob 92 will not become air locked in the drop funnel 37 and fail to move downward as it should. It is possible when tapering such a funnel 37 to cause the gob 92 to become air locked, due to the inability of the air in front of the gob 92 to escape at a sufficient rate. Thus, the grooves 96, 97, 98 and 99 provide a means of venting the air in front of the gob 92 and thus allowing it to pass smoothly through the drop funnel 37 while tapering its cross-sectional area to provide a proper attitude. Thus, the gob 92 is not appreciably slowed during its passage through the drop funnel 37 but is rather shaped and guided for proper delivery.

Furthermore, the fact that the gob, during its travel through the funnel, is only touched by the funnel at four symmetrical areas, guiding and centering of the gob, to a greater degree than hitherto possible, is carried out without imposing severe chill to the gob. It should be appreciated that if the gob were to be contacted completely around its circumference and along its length by the funnel, it would be slowed down by friction and also excessively chilled by contact with the funnel. These grooves 96–99 are also provided to allow the gob 92 to expand slightly in cross-sectional area. As the cross section of the drop funnel 37 tapers, the gob 92 is forced through a smaller opening. It is undesirable to force a gob 92 to be extruded axially in this process. Thus, the grooves 96–99 allow the gob 92 to expand slightly in cross-sectional area.

What I claim is:

1. Apparatus for guiding gobs of molten glass that have been sheared by glass shears from streams of molten glass issuing downwardly from a glass feeder comprising, a substantially horizontal arm having one end supported by the feeder with its other end extending outwardly into a position slightly offset from the axis of gobs being sheared, a vertically positioned V-block mounted on said other end of said arm with the upper end of said V-block being immediately below the plane of the shears, said mounting comprising horizontal adjusting means, in two directions, for said V-block relative to said arm for positioning said V-block in precise alignment with the vertical axis of gobs being severed, and a drop funnel positioned in vertical alignment beneath said V-block to receive gobs centrally thereof.

2. The apparatus as defined in claim 1, wherein said drop funnel comprises an elongated tubular member having a substantially circular cross-sectional opening formed in the upper end thereof and tapering to a smaller substantially circular cross-sectional opening at the lower end thereof, said drop funnel being formed with interior grooves in the tapered section thereof, whereby gobs of glass are maintained in precise, vertical alignment after severing and guided into a precise vertical path by the drop funnel without retarding the movement thereof.

3. The apparatus of claim 1, wherein said V-block is formed with two interconnecting, vertical passages therein, and further including means connected thereto for introducing coolant to said passages and draining coolant from said passages.

4. The apparatus of claim 1, wherein said adjusting means comprises a V-block supporting bracket having a horizontal T-shaped lower surface and a vertical surface, a horizontal slot formed in a plate mounted on said arm for receiving said T-surface of said block, means to lock said lower surface in sliding engagement with said slot, and threaded means extending between said arm and said bracket for adjustably positioning said bracket on said arm, to thereby horizontally shift said bracket relative to said arm and means mounting said V-block on said vertical surface of said bracket.

5. The apparatus of claim 4, wherein said V-block is formed with a horizontal slot portion on its vertical back, elongated groove formed in the vertical surface of said bracket and adapted to receive said vertical back means engaging said horizontal slot for holding said vertical back in sliding engagement and means connected between said bracket and said V-block for adjusting the position of said V-block relative to said bracket.

* * * * *